United States Patent [19]
Bishop et al.

[11] 3,894,280
[45] July 8, 1975

[54] FREQUENCY LIMITED FERRORESONANT POWER CONVERTER

[75] Inventors: John Daniel Bishop, Morris Township, Morris County, N.J.; Ladislas George Kerenyi, Jr., Bronx, N.Y.

[73] Assignee: Western Electric Company Bell Telephone Laboratories Incorporated, Murray Hill, N.J.

[22] Filed: Apr. 2, 1974

[21] Appl. No.: 457,165

[52] U.S. Cl. .................. 321/18; 321/2; 321/10; 321/25; 323/60
[51] Int. Cl. .................. H02m 3/32; G05f 1/56
[58] Field of Search .............. 321/2, 10, 16, 18, 25, 321/45 R; 331/113 A, 109, 183; 323/60, 61

[56] References Cited
UNITED STATES PATENTS

| | | | |
|---|---|---|---|
| 3,590,362 | 6/1971 | Kakalec | 321/18 X |
| 3,679,962 | 7/1972 | Wanlass | 323/60 X |
| 3,699,424 | 10/1972 | Hart et al. | 321/4 SR |
| 3,815,015 | 6/1974 | Swin et al. | 321/2 X |
| 3,818,314 | 6/1974 | Bishop et al. | 321/4 SR |

*Primary Examiner*—Gerald Goldberg
*Attorney, Agent, or Firm*—J. S. Cubert

[57] ABSTRACT

A transformer in combination with a push-pull transistor switch forms the inverter of a DC to DC converter. Feedback from the rectified output of the transformer ferroresonant winding controls the inverter frequency. A controllable current source solely responsive to a signal derived from the converter output voltage controls the charging of a timing capacitor which upon reaching a threshold value causes termination of each inverter half-cycle. The current source includes a clamping device operative to limit the inverter frequency to a region where effective negative feedback regulation is maintained.

6 Claims, 2 Drawing Figures

FREQUENCY LIMITED FERRORESONANT POWER CONVERTER

BACKGROUND OF THE INVENTION

Our invention relates to power conversion apparatus, more particularly to a DC power converter using an inverter in conjunction with a ferroresonant transformer, and more particularly to a regulated DC to DC converter wherein the output voltage is utilized to control the inverter frequency.

Complex electronic systems generally require a number of different regulated voltages which must be held to close tolerances under widely varying load conditions. It is important that the supply apparatus providing the regulated voltages be efficient to limit power usage and heat dissipation. In an electronic system, unnecessary heat dissipation from a number of power supplies may limit the system capability.

U.S. Pat. No. 3,699,424, issued to H. P. Hart et al. on Oct. 17, 1972, and assigned to the same assignee, discloses a DC to DC converter utilizing an inverter and a ferroresonant regulator. Since the output of the regulator is a function of frequency, the converter output voltage is readily regulated by controlling the inverter frequency. In Hart et al, the inverter frequency control is obtained by switching an inductor across the control winding of the inverter transformer responsive to a timing capacitor attaining a threshold voltage. The switching action is effective to terminate each half-cycle of the inverter. The timing capacitor charging rate is controlled by an impedance connected to the control winding and in parallel with an amplifier whose impedance is a function of the converter output voltage. In this arrangement, the charging of the timing capacitor is a function of the inverter source voltage whereby the converter output voltage is affected by source voltage variations.

The amplifier feedback arrangement of Hart et al is effective as negative feedback as long as the output voltage is an increasing function of inverter frequency. As is well known in the art related to ferroresonant regulators, however, a critical frequency is reached above which the output voltage decreases with increasing inverter frequency. In the latter region of operation regenerative feedback takes place and the feedback control of the inverter frequency is rendered ineffective. Under these conditions, the inverter frequency is not adequately controlled by the converter output voltage and output voltage regulation is ineffective. A similar feedback regulation arrangement is disclosed in Bishop et al, U.S. Pat. No. 3,818,314, issued June 18, 1974, the same limitations are found.

It is an object of the invention to provide a DC to Dc converter circuit with improved feedback regulation.

It is another object of the invention to provide an improved DC to DC converter circuit in which effective feedback regulation is maintained over an extended range of operation.

It is another object of the invention to provide a DC to DC converter using an inverter in combination with a ferroresonant transformer wherein the maximum inverter frequency is limited to maintain effective feedback regulation.

BRIEF SUMMARY OF THE INVENTION

The invention is a DC to DC converter wherein a transformer having a ferroresonant winding is combined with a push-pull transistor switching circuit to form an inverter. A feedback arrangement controls the inverter frequency responsive to the converter output obtained from the ferroresonant transformer winding. The feedback loop includes a capacitor which determines the termination of each inverter half-cycle via switching means connected to the transformer. A controllable current source responsive solely to the converter output voltage controls the charging rate of said capacitor.

According to an aspect of the invention, a device is inserted in the controllable current source to limit the output of the current source so that negative feedback regulation of the inverter frequency is maintained.

In an embodiment illustrative of the invention, first and second transistor type switches are connected in a push-pull arrangement with the primary winding of a ferroresonant transformer to form an inverter. A second winding regeneratively returns the transformer primary output alternately to the inputs of the first and second switches to maintain inverter oscillation. A control winding on the transformer has a common magnetic path with the primary winding, and a secondary ferroresonant winding is isolated from the primary and control windings by a magnetic shunt. A capacitor is combined with the secondary winding to form a ferroresonant circuit from which the converter output voltage is obtained. Frequency determining switching circuitry connected across the control winding includes a timing capacitor charged through a controllable current source, which source is solely responsive to the converter output voltage. Upon attaining a predetermined threshold, the timing capacitor is discharged causing a gated switch to short circuit the control winding whereby the inverter half-cycle is terminated. The feedback arrangement, including the current source, controls the frequency of the inverter responsive to the converter output voltage. In this way, the inverter output voltage is regulated independently of the inverter input power source over the desired operating range.

The controllable current source includes a transistor amplifier, the collector-emitter path of which is coupled between the control winding and the timing capacitor by a rectifier bridge. The transistor amplifier collector-emitter path controls the charging current supplied to the timing capacitor responsive to the fed-back converter output voltage applied to said transistor base. An avalanche diode connected to the transistor amplifier base is responsive to a predetermined feedback voltage level to clamp the base voltage whereby the capacitor charging current is limited to a value that ensures negative feedback regulation.

DETAILED DESCRIPTION OF THE DRAWING

Figure 1:
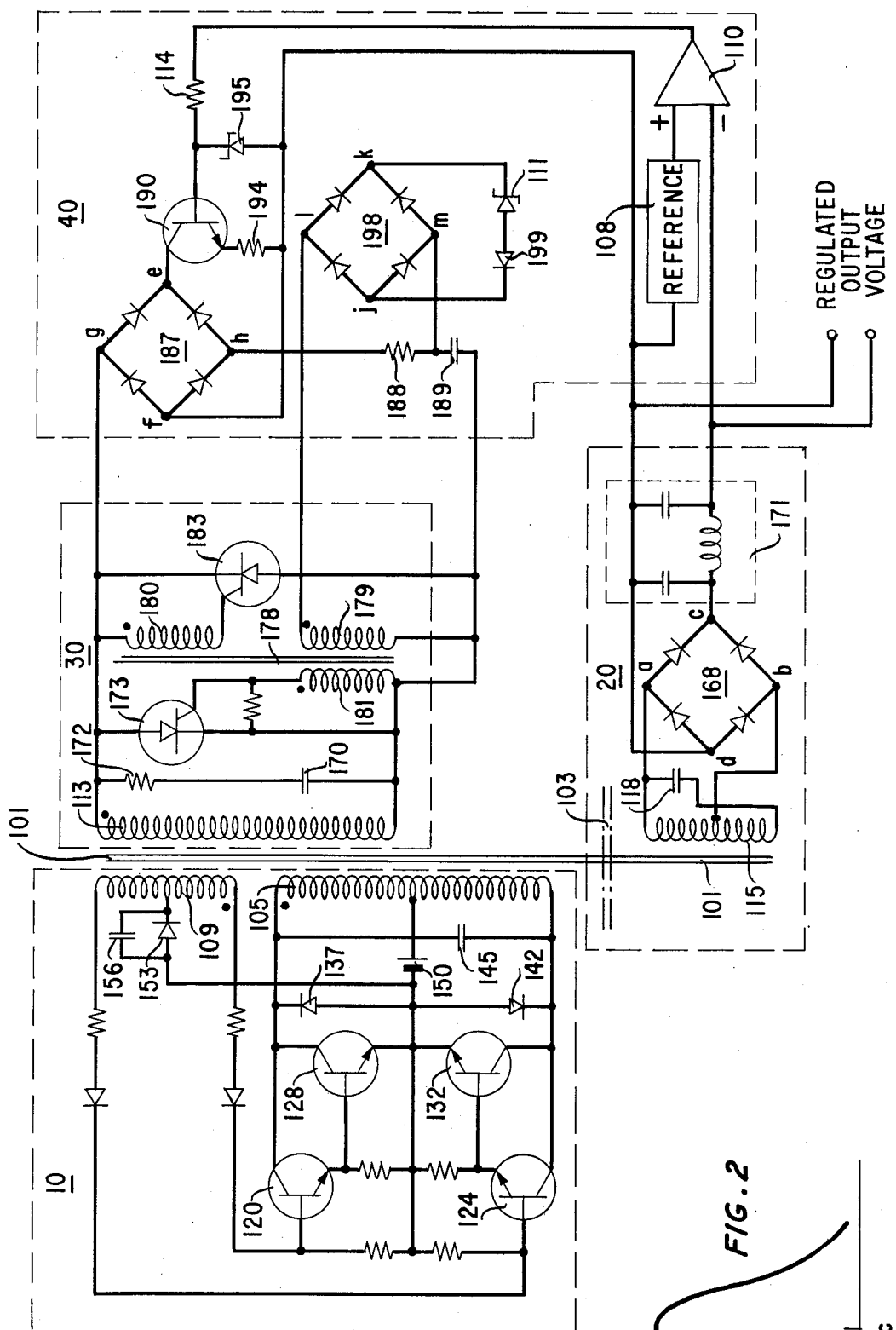
FIG. 1 depicts a schematic diagram of an embodiment illustrative of the invention.

The DC to DC converter of FIG. 1 includes inverter 10, ferroresonant output circuit 20, inverter frequency determining circuit 30, and feedback circuit 40 which controls the frequency of inverter 10 responsive to the output of circuit 20. Inverter 10 is powered by DC source 150 which may comprise a battery or other potential source. Transistors 120 and 128 form a Darlington pair transistor switch well known in the art, and transistors 124 and 132 similarly form another Darlington pair transistor switch. These transistor switches are connected in a push-pull arrangement with windings 105 and 109 of transformer 101. Alternate turn-on of transistor switch pair 120 and 128 and transistor switch pair 124 and 132 alternately magnetizes transformer 101 via primary winding 105 whereby an alternating voltage appears across primary winding 105. The primary winding voltage waveform is a square wave. Inverter circuit 10 responds to frequency determining circuit 30. Circuit 30 provides a short circuit impedance to appear across winding 109 to cause termination of each half-cycle whereby push-pull oscillation is obtained.

It is assumed, for purposes of illustration, that inverter circuit 10 is operating in its steady state condition. The starting of the inverter circuit is accomplished by the use of a special starting circuit (not shown) which may comprise a series R-C network connected between power source 150 and the input of one of the inverter transistor switches. Upon power turn-on, the previously uncharged R-C network provides an initial start pulse to one of the transistor switches. Alternatively, an imbalance between transistor switches may provide start of oscillation.

Consider the state of the inverter when switching transistors 120 and 128 are conducting and transistor 128 is saturated while transistors 124 and 132 are cut off. At this time, a current flows from source 150 through one-half of primary winding 105 and through the collector-emitter paths of transistors 120 and 128 back to source 150. The current increases in winding 150 as long as the gain of transistor pair 120 and 128 is sufficient to support the primary winding current. The flux coupling between windings 105 and 109 induces a voltage in winding 109 which maintains the saturated conduction of transistor pair 120 and 128 and keeps transistors 124 and 132 in their cut-off condition. The voltage across primary winding 105 causes a voltage to appear across control winding 113. The control winding and primary winding voltages, are maintained until a short circuit is placed across winding 113 by turn on of one of silicon controlled rectifiers 173 and 183 responsive to the operation of circuit 40.

Control winding 113 is closely coupled to drive winding 109 but is relatively loosely coupled to primary winding 105. When a short circuit impedance is placed across control winding 113 by a conducting silicon controlled rectifier at the termination of an inverter half-cycle, a very low impedance is reflected across winding 109. But there is only a minor reduction in the impedance across winding 105. Responsive to the low reflected impedance in winding 109, transistors 120 and 128 turn off and the decreasing collector current of transistor 128 causes a voltage reversal in winding 105.

Capacitor 145 forms a series resonant circuit with the leakage inductance between windings 105 and 113. The resonant frequency of the leakage inductance and capacitor 145 combination is determined by the desired inverter switching time. The changing voltage in the resonant circuit causes a sinusoidal current in winding 113. When this sinusoidal current passes through zero, the conducting silicon controlled rectifier turns off. The reverse voltage in winding 105 then reverses the voltage across winding 109 and transistors 124 and 132 are regeneratively turned on to start the next inverter half-cycle.

Capacitor 156 and diode 153 are operative to prevent simultaneous turn on of both transistor switches. During the half-cycle when transistors 120 and 128 are conducting, capacitor 156 is charged to the voltage across diode 153. Upon short circuiting of winding 109, the voltage across capacitor 156 provides a reverse bias to transistors 120 and 124 so that both transistor switches are turned off. When the short circuit is removed, the voltage across winding 109 causes transistor 124 to conduct and reverse bias to transistor 120 so that the new half-cycle is started. Diodes 137 and 142 provide protection for the transistor switches from high reverse voltage transients.

Ferroresonant output circuit 20 is of a well-known type. Output winding 115 is wound on a saturating core portion of transformer 101. This core portion is isolated from the remaining parts of transformer 101 by magnetic shunts 103. Capacitor 118 is connected across winding 115 to form a ferroresonant circuit. The core portion on which winding 115 is wound saturates every half-cycle at a fixed voltage time integral to reverse the voltage on capacitor 118 in typical ferroresonant regulator operation well known in the art. Bridge rectifier 168 is connected across winding 115 to provide a DC output voltage. II-type filter network 171 is connected across the output side of bridge rectifier 168 to provide filtering.

Figure 2:
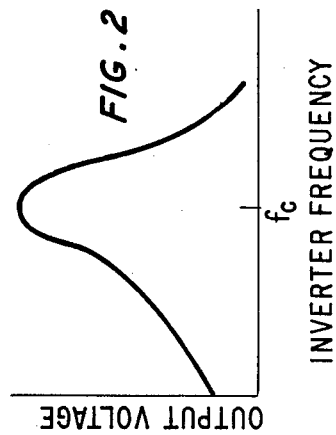
FIG. 2 illustrates the operating characteristics of a DC to DC converter in accordance with the invention.

FIG. 2 shows the output voltage of an inverter of the type that is used in the circuit of FIG. 1 as a function of inverter frequency. In the region below frequency $f_c$, the output voltage is an increasing function of inverter frequency. In the region above frequency $f_c$, the output voltage becomes a decreasing function of inverter frequency. This curve results from the well-known operation of a ferroresonant regulator. The DC to DC converter output voltage may be regulated by controlling the inverter frequency from the converter output voltage. In the region below frequency $f_c$, an increase in output voltage may be applied to frequency determining circuit 30 to reduce the inverter frequency. Similarly, a decrease in output voltage may be used to effect an increase in inverter frequency. This method of control regulates the converter output voltage.

The inverter frequency is determined by the charging of timing capacitor 189. Capacitor 189 is connected in series with resistor 188 and transistor current source 190 across control winding 113 via rectifier bridge 187. When the voltage across winding 113 is positive from point g on rectifier bridge 187 to the lower side of capacitor 189, capacitor 189 is charged through the path g–e of rectifier 187, the collector-emitter path of transistor 190, emitter resistor 194, the path f–h of rectifier 187, and resistor 188. The charging current is determined solely by the current through transistor 190 because of the high collector impedance resulting from use of emitter resistor 194.

The voltage across capacitor 189 is applied to the series combination of pnpn diode 199 and avalanche diode 111 through rectifier bridge 198, and the pnpn diode-avalanche diode combination, in turn, is connected to winding 179 of transformer 178. When the voltage across capacitor 189 reaches a predetermined threshold voltage, diode 199 is very rapidly fired into conduction and capacitor 189 discharges through winding 179 of transformer 178. In the positive half-cycle, the resulting pulse in transformer 178 causes a positive pulse to appear across winding 181, which positive voltage fires silicon controlled rectifier 173 to terminate the positive half-cycle.

After silicon controlled rectifier 173 is extinguished by the resonant ringing of capacitor 145 and the leakage inductance between windings 105 and 113, the negative half-cycle is started. Capacitor 189 is then charged in the reverse direction by current source transistor 190. In the negative half-cycle, current flows through capacitor 189, resistor 188, path n-e of rectifier 187, the collector-emitter path of transistor 190, emitter resistor 194, and path f-g of rectifier 187. When the threshold voltage across capacitor 189 is reached, pnpn diode 199 is very rapidly turned on and capacitor 189 is discharged through rectifier bridge 198, diodes 199 and 111, and winding 179 of transformer 178. At this time, a positive voltage pulse appears across winding 180 and a negative voltage pulse appears across winding 181. The positive pulse on winding 180 turns on silicon controlled rectifier 183. Winding 113 is short circuited and the negative half-cycle is terminated.

The rectified and filtered converter output voltage from filter 171 is applied to the negative input of operational amplifier 110. A reference voltage which may be obtained from an avalanche diode source is developed in reference source 108 and is applied to the positive input of amplifier 110. The output of amplifier 110 is proportional to the difference between the converter output voltage and the reference voltage and is applied to the base of transistor 190 through resistor 114. If the converter output voltage is less than the reference, the voltage to the base of transistor 190 is increased. The resulting transistor collector-emitter path current is increased whereby the charging rate is capacitor 189 is increased. Consequently, the half-cycle time of the inverter is decreased so that the inverter frequency rises. In accordance with FIG. 2, an increase in inverter frequency below $f_c$ increases the converter output voltage to correct the deviation from the reference.

An increase in converter output voltage applied to amplifier 110 results in a lower base voltage on transistor 190, which base voltage is proportional to the difference between the converter output voltage and the voltage from reference 108. The lower base voltage causes a reduction in the collector-emitter current of transistor 190, which, in turn, reduces the charging rate of capacitor 189. Consequently, the half-cycle time of the inverter is increased whereby the inverter frequency decreases. In accordance with FIG. 2, a decrease in inverter frequency in the region below $f_c$ reduces the converter output voltage to correct the deviation from the reference. In this manner, negative feedback from the converter output to timing capacitor 189 provides output voltage regulation.

In accordance with the invention, the charging current for capacitor 189 is independent of the voltage across winding 113. This is so because the current through transistor 190 is independent of the voltage across winding 113 in the normal range of operation. The collector-emitter impedance of transistor 190 is normally high and the addition of resistor 194 in the emitter circuit of transistor 190 provides an additional increase in collector-emitter impedance which makes transistor 190 a constant current source controlled by the voltage applied to its base. Thus, variations in the voltage of source 150 which appear across output winding 113 do not affect the regulation of the converter output voltage.

The described feedback is fully effective to provide inverter output voltage regulation in the region below $f_c$ of FIG. 2. Where $f_c$ is exceeded, an increase in inverter frequency results in a decrease in converter output voltage. The reduced output voltage causes an increase in the base voltage of transistor 190 whereby the charging current applied to capacitor 189 is increased. Consequently, the inverter frequency is further increased in accordance with the curve on FIG. 3. A further increase in inverter frequency results in a further reduction in the converter output voltage. It is readily seen that the feedback at inverter frequencies above $f_c$ is regenerative and does not provide output voltage regulation. f Negative feedback is only obtained when the slope of the ratio of output voltage to inverter frequency is positive. It is therefore desirable to limit the operation of the DC to DC converter to inverter frequencies below $f_c$. This is especially true if the converter circuit is physically divided into an inverter unit that is separated from the rectifier and filter arrangement. Without a limitation on the inverter frequency, the separated units obtained during manufacture may be incompatible and interchangeability may not be possible without severe limitations on the range of operation. In accordance with the invention, avalanche diode 195 is connected between the base of transistor 190 and the junction between resistor 194 and terminal f of bridge rectifier 187. The output voltage of amplifier 110 is supplied via impedance 114 to the cathode of avalanche diode 195. Thus, if the feedback voltage on the base of transistor 190 exceeds a value which would result in an inverter frequency above $f_c$, avalanche diode 195 conducts to limit the base voltage. At the limited base voltage, the maximum current in the collector-emitter path of transistor 190 is fixed whereby the charging rate of capacitor 189 is controlled so that frequency $f_c$ is not exceeded. The controllable current source arrangement including avalanche diode 195 therefore operates as a frequency clamp so that feedback regulation of the converter output voltage is always effective. Resistor 194 is selected in accordance with the parameters of transformer 101 so that the maximum current for frequency $f_c$ is obtained from current source transistor 190 with avalanche diode 195.

What is claimed is:

1. A DC to DC converter comprising an inverter circuit having positive and negative half-cycles of oscillation, said inverter circuit including a transformer having a primary winding, a control winding, and a ferroresonant output winding, and a pair of transistor switches connected in push-pull arrangement with said primary winding; and means for controlling the frequency of said inverter comprising a capacitor, feedback means connected from said output winding to said capacitor for charging said capacitor during each inverter half-cycle, switching means connected across said control winding and to said capacitor responsive to the capacitor voltage attaining a predetermined value for terminating said inverter half-cycle and for discharging said capacitor to a predetermined state, said feedback means comprising a controllable current source responsive to the output winding voltage to charge said capacitor in each half-cycle, and means for coupling said current source between said control winding and said capacitor, said controllable current source including means for limiting the charging current applied to said capacitor in each inverter half-cycle whereby the maximum inverter frequency is fixed.

2. A DC to DC converter according to claim 1 wherein said controllable current source comprises means responsive to said output winding voltage for producing a signal to control the charging current applied to said capacitor, and said charging current limiting means comprises means for clamping said produced signal to limit said charging current to a predetermined maximum.

3. A DC to DC converter according to claim 1 wherein said coupling means comprises a bridge rectifier having first, second, third, and fourth terminals, said first terminal being connected to one end of said control winding, said second terminal being connected to said capacitor, the other side of said capacitor being connected to the other end of said control winding, and said controllable current source comprises a transistor having an emitter, base, and a collector, said collector being connected to said bridge rectifier third terminal, impedance means connected between said emitter and said bridge rectifier fourth terminal, means for applying a signal derived from said output winding voltage to said base, said charging current being solely responsive to said base voltage, said bridge rectifier being adapted to apply a first polarity charging current to said capacitor through said transistor collector-emitter path during each positive half-cycle of said inverter and for applying a second polarity charging current to said capacitor through said transistor collector-emitter path during each negative half-cycle of said inverter, and said charging current limiting means comprises a voltage limiting device connected between said transistor base and said bridge rectifier fourth terminal whereby the maximum charging current is limited to fix the maximum inverter frequency.

4. A DC to DC converter according to claim 3 wherein said voltage limiting device comprises an avalanche diode having a cathode connected to said base and an anode connected to said bridge rectifier fourth terminal.

5. A DC to DC converter comprising an inverter including a pair of transistor switches and a transformer including a primary winding, a control winding, and a ferroresonant output winding, a magnetic path common to said primary and control windings, and a magnetic shunt for separating said control and output windings; means for rectifying the voltage across said output winding; said pair of transistor switches being coupled to said primary winding in a push-pull arrangement; switching means connected across said control winding; means for turning on said switching means to momentarily short circuit said control winding to terminate each half-cycle of said inverter comprising a timing capacitor, means for regulating charging of said timing capacitor, means connected between said timing capacitor and said switching means responsive to a predetermined voltage across said timing capacitor for applying a pulse to said turn-on means, said regulating means comprising means for producing a reference voltage, a controllable current source, and means for coupling said controllable current source between said control winding and said timing capacitor, said capacitor and said coupled controllable current source being serially connected across said control winding, said controllable current source being responsive solely to the difference between said rectified output voltage and said reference voltage to charge said capacitor during each inverter half-cycle, said regulating means further comprising means for clamping said controllable current source to produce a fixed maximum current upon said difference voltage exceeding a predetermined value whereby the charging rate of said capacitor and the frequency of said inverter are limited to a predetermined maximum.

6. A DC to DC converter according to claim 5 wherein said coupling means comprises a diode bridge rectifier having first, second, third, and fourth terminals, said control winding having first and second terminals, said capacitor having first and second terminals, said controllable current source comprising a transistor having a base, an emitter and a collector, said bridge rectifier first terminal being connected to said control winding first terminal, first impedance means connected between said bridge rectifier second terminal and said capacitor first terminal, said capacitor second terminal being connected to said control winding second terminal, said collector being connected to said bridge rectifier third terminal, second impedance means connected between said emitter and said bridge rectifier fourth terminal, and means for applying a signal proportional to the difference between said rectified output voltage and said reference voltage to said base, and said clamping means comprises an avalanche diode having a cathode and an anode, said avalanche diode cathode being connected to said base, and said avalanche diode anode being connected to said bridge rectifier fourth terminal.

* * * * *